United States Patent
Files et al.

(10) Patent No.: US 10,788,865 B1
(45) Date of Patent: Sep. 29, 2020

(54) INFORMATION HANDLING SYSTEM DUAL PIVOT HINGE SIGNAL PATH

(71) Applicant: Dell Products L.P., Round Rock, TX (US)

(72) Inventors: Jace W. Files, Round Rock, TX (US); Chiu-Jung Tsen, Hsinchu (TW); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/396,046

(22) Filed: Apr. 26, 2019

(51) Int. Cl.
   *G06F 1/16* (2006.01)
   *G06F 1/3206* (2019.01)

(52) U.S. Cl.
   CPC .......... *G06F 1/1681* (2013.01); *G06F 1/1616* (2013.01); *G06F 1/1683* (2013.01); *G06F 1/3206* (2013.01)

(58) Field of Classification Search
   CPC .............................. G06F 1/1681; G06F 1/1683
   See application file for complete search history.

(56) References Cited

U.S. PATENT DOCUMENTS

| | | | | |
|---|---|---|---|---|
| 3,665,509 A | * | 5/1972 | Elkins | H01R 13/523 439/42 |
| 3,838,234 A | * | 9/1974 | Peterson | E05D 11/0081 200/61.7 |
| 3,860,312 A | * | 1/1975 | Gordon, Jr. | H01R 39/64 439/31 |
| 4,421,371 A | * | 12/1983 | Clark | H01R 13/631 439/249 |
| 4,640,570 A | * | 2/1987 | Strate | H01R 13/631 439/271 |
| 5,396,351 A | | 3/1995 | Gessel | |
| 5,409,403 A | * | 4/1995 | Falossi | H01R 24/38 439/21 |
| 5,553,296 A | | 9/1996 | Forrest et al. | |
| 5,699,444 A | | 12/1997 | Palm | |
| 5,825,436 A | | 10/1998 | Knight | |
| 5,829,987 A | * | 11/1998 | Fritsch | H01R 13/7037 439/38 |
| 5,894,298 A | | 4/1999 | Hoeksma | |
| 5,897,382 A | * | 4/1999 | Takahashi | G06F 1/1616 361/729 |

(Continued)

OTHER PUBLICATIONS

U.S. Appl. No. 16/107,748, entitled "Context Aware Secondary Screen UI on Dual Screen Productivity 2-in-1 Devices", filed Aug. 21, 2018, by Viswanathan et al.

(Continued)

*Primary Examiner* — Adrian S Wilson
(74) *Attorney, Agent, or Firm* — Zagorin Cave LLP; Robert W. Holland

(57) ABSTRACT

A portable information handling system rotationally couples housing portions with a dual axis hinge and communicates signals between the housing portions through a signal conduit inserted over the axles of the dual axis hinge. Signal contact elements coupled to opposing housing portions interface wirelines to contact fingers that insert in the signal conduit. Conductive surfaces in the signal conduit transmit signals across the dual axis hinge at varying rotational orientations by maintaining an electrical interface with opposing contact fingers.

20 Claims, 5 Drawing Sheets

(56) References Cited

U.S. PATENT DOCUMENTS

| | | |
|---|---|---|
| 6,252,767 B1 | 6/2001 | Carlson |
| 6,322,229 B1 | 11/2001 | Chan et al. |
| 6,370,020 B1* | 4/2002 | Toukairin ............... F16M 11/08 174/86 |
| 6,530,784 B1* | 3/2003 | Yim ...................... G06F 1/1616 361/679.29 |
| 6,646,626 B1 | 11/2003 | Uskali et al. |
| 7,301,532 B1 | 11/2007 | Dobry |
| 7,430,003 B2 | 9/2008 | Nichols et al. |
| 7,502,010 B2 | 3/2009 | Kirk |
| 7,843,429 B2 | 11/2010 | Pryor |
| 8,707,174 B2 | 4/2014 | Hinckley et al. |
| 9,395,762 B2 | 7/2016 | Sharma et al. |
| 9,524,139 B2 | 12/2016 | Aurongzeb et al. |
| 9,785,198 B2* | 10/2017 | Grinstead ............. G06F 1/1681 |
| 9,820,086 B2* | 11/2017 | Bologna ............. H04B 5/0031 |
| 9,946,373 B2 | 4/2018 | Graf et al. |
| 10,185,369 B1* | 1/2019 | Yu ......................... G06F 1/1681 |
| 10,204,592 B1 | 2/2019 | Trim et al. |
| 10,559,931 B2* | 2/2020 | Reed .................. H01R 33/7635 |
| 2004/0038719 A1* | 2/2004 | Lee ........................ H01R 35/04 455/575.7 |
| 2006/0048340 A1* | 3/2006 | Zaderej ................. H01R 35/04 16/385 |
| 2006/0132447 A1 | 6/2006 | Conrad |
| 2007/0072443 A1* | 3/2007 | Rohrbach ................. G06F 1/18 439/39 |
| 2007/0182663 A1 | 8/2007 | Biech |
| 2007/0234521 A1 | 10/2007 | Komppa |
| 2008/0129953 A1* | 6/2008 | Blum ...................... G02C 11/10 351/153 |
| 2008/0232061 A1* | 9/2008 | Wang ..................... G06F 1/1632 361/679.41 |
| 2009/0141439 A1* | 6/2009 | Moser ................... G06F 1/1681 361/679.29 |
| 2009/0218407 A1* | 9/2009 | Rofougaran ..... G06K 19/07775 235/492 |
| 2011/0012858 A1 | 1/2011 | Brookes et al. |
| 2011/0199726 A1* | 8/2011 | Moser ................... G06F 1/1616 361/679.09 |
| 2011/0209039 A1 | 8/2011 | Hinckley et al. |
| 2012/0066591 A1 | 3/2012 | Hackwell |
| 2013/0077812 A1* | 3/2013 | Kishinami ............... H04R 1/02 381/334 |
| 2013/0229760 A1* | 9/2013 | Whitt, III ............... G05B 11/01 361/679.08 |
| 2014/0029183 A1 | 1/2014 | Ashcraft et al. |
| 2014/0043745 A1* | 2/2014 | McCormack ............ G06F 3/14 361/679.09 |
| 2014/0078116 A1 | 3/2014 | Mercea et al. |
| 2014/0169853 A1* | 6/2014 | Sharma ................. G06F 3/0202 400/481 |
| 2014/0220790 A1* | 8/2014 | Lee ........................ H01R 35/04 439/31 |
| 2015/0138714 A1* | 5/2015 | Davis .................... G06F 1/1654 361/679.28 |
| 2016/0147267 A1 | 5/2016 | Campbell et al. |
| 2016/0182132 A1* | 6/2016 | Pelissier ............. H04B 5/0075 455/41.1 |
| 2018/0052497 A1* | 2/2018 | Maatta .................. G06F 1/1616 |
| 2018/0067520 A1 | 3/2018 | Maatta et al. |
| 2018/0115131 A1* | 4/2018 | Kohen ............... H01R 13/6658 |
| 2018/0198308 A1* | 7/2018 | Files ..................... G06F 1/1618 |
| 2019/0163432 A1 | 5/2019 | Files et al. |
| 2019/0278323 A1 | 9/2019 | Aurongzeb et al. |
| 2020/0064892 A1* | 2/2020 | Iyer ....................... G06F 3/0487 |

OTHER PUBLICATIONS

Foreign Search Report Written Opinion from PCT/US2020/026085 dated Jun. 30, 2020 (7 pages).

* cited by examiner

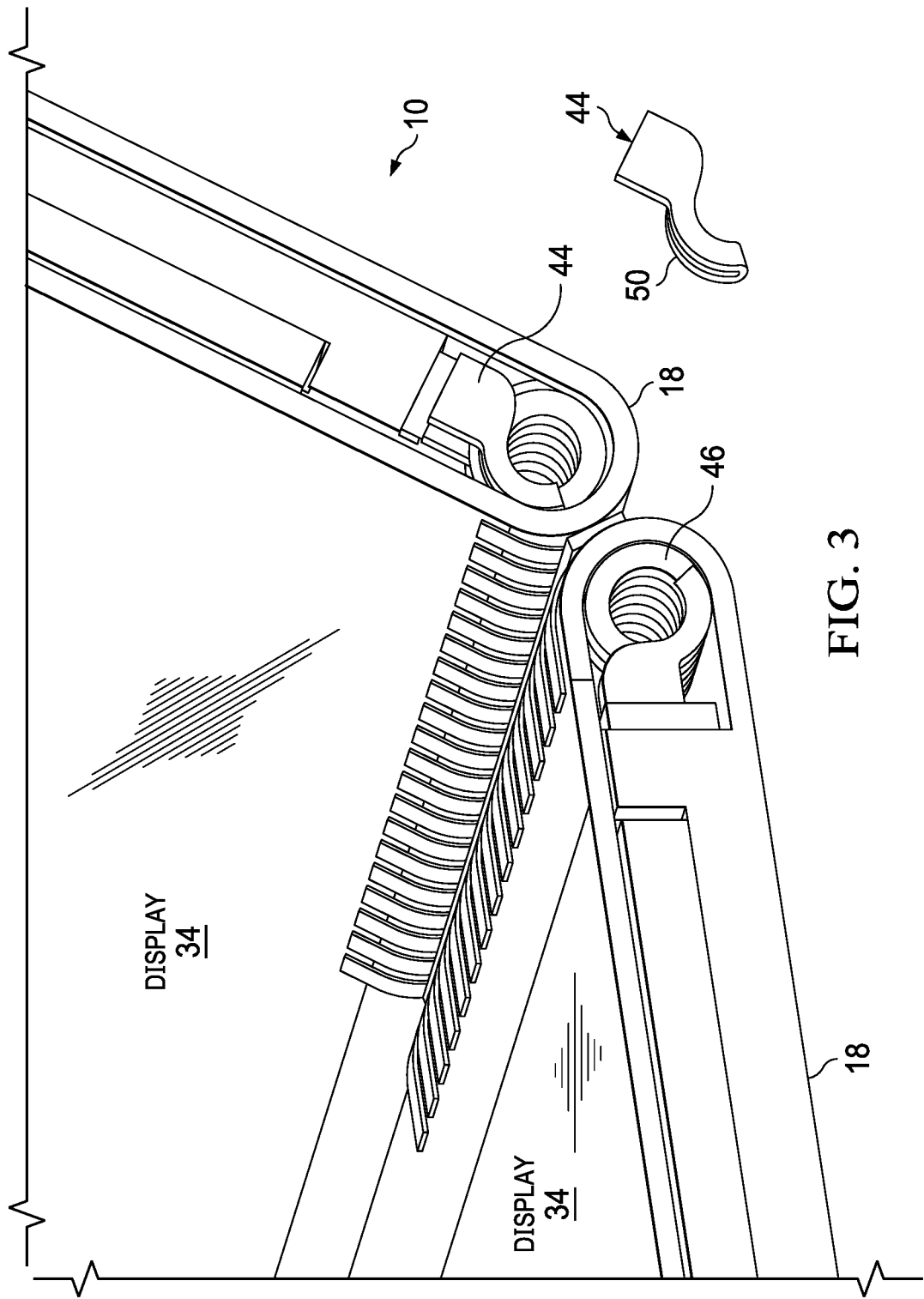

INFORMATION HANDLING SYSTEM DUAL PIVOT HINGE SIGNAL PATH

BACKGROUND OF THE INVENTION

Field of the Invention

The present invention relates in general to the field of portable information handling systems, and more particularly to an information handling system dual pivot hinge signal path.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Recently, convertible information handling systems have started integrating touchscreen displays over top of both housing portions so that a larger display footprint is available when the housing portions rotate 180 degrees to a flat tablet mode. In the clamshell mode, the touchscreen display oriented as a base presents a keyboard for the end user, or, a peripheral keyboard may rest near or over the base to accept keyed inputs. In addition to offering an increased touchscreen display footprint in the tablet mode, the dual display configuration reduces system thickness (i.e., Z height) by eliminating the keyboard, as well as system weight. Reduced system thickness improves system portability.

One difficulty with the dual display configuration is that lower Z height of the housing portions tends to decrease hinge size and the amount of space available for routing communications wires between the housing portions. For example, a graphics processor typically resides in one housing portion to generate pixel values that define visual images at both housing portions. A graphics cable generally is used to transmit pixel values across the hinges to the display. In some low Z height systems, processing components can be disposed across both housing portions with a system link providing communication, such as a PCIe link. In order to provide a robust communication interface, cable routing has to protect against damage that can arise due to rotation of housing portions about a hinge. Portable information handling systems that support 360 degrees of rotational movement typically have a dual axis hinge that compounds cable routing difficulties where the cable routes through each axis and is subject to motion about each axis.

SUMMARY OF THE INVENTION

Therefore, a need has arisen for a system and method which provides a signal path across a dual axle pivot of a portable information handling system.

In accordance with the present invention, a system and method are provided which substantially reduce the disadvantages and problems associated with previous methods and systems for transferring signals between rotationally-coupled housing portions. A signal conduit slides onto dual axles of a hinge to rotate with the axles and includes a conductive surface that conducts signals across the axles. Contact fingers extend from each of opposing housing portions that are rotationally coupled by the dual axes hinge to contact the conductive surface for defining a signal pathway between the housing portions that maintains communication during rotation of the housing portions.

More specifically, a portable information handling system processes information with processing components disposed in housing portions rotationally coupled to each other by a dual axes hinge, such as to support 360 degrees of rotation. The processing components communicate across the dual axes hinge through a signal communication system that maintains communication through 360 degrees of rotation of the housing portions relative to each other. Each housing portion couples plural signal wirelines to a signal contact element with each wireline interface to a contact finger terminating at a conductive tip. The contact fingers insert into openings formed between supports of a signal conduit that integrates a conductive surface for transmitting communication signals. In one example embodiment, the signal conduit supports have a non-conductive surface formed at predetermined rotational orientations so that a function is initiated at the rotational orientations, such as powering down the system, powering up the system, presenting a keyboard, removing a keyboard, powering down a display, establishing or removing tension at a flexible display, and powering down a portion of a display.

The present invention provides a number of important technical advantages. One example of an important technical advantage is that a signal path is provided through a dual axis hinge without a cable that can bind during hinge movement. Conductive plates integrated in each of plural double-disc shaped supports communicate signals with contact fingers located at each of the housing portions in the place of a cable passing through the hinge. The double-disc shaped supports conform to parallel axles of a dual axis hinge to readily rotate about the axles as the housing portions move through 360 degrees of relative rotation. In some instances, open portions formed in the conductive plates control signal passage based upon rotational orientation of the housing portions, such as to power on or off the system, or to command a keyboard at a display of a housing portion when a clamshell configuration is realized. Reliable and robust signal transfer is achieved across rotationally-coupled housing portions with an inexpensive and readily manufactured structure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 depicts a side cutaway perspective view of an information handling system that communicates signals between housing portions through a signal conduit;

DETAILED DESCRIPTION

A portable information handling system communicates signals across a dual axis hinge through a signal communication system that interfaces conductive surfaces coupled to hinge axles with contact fingers extending from rotationally coupled housing portions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
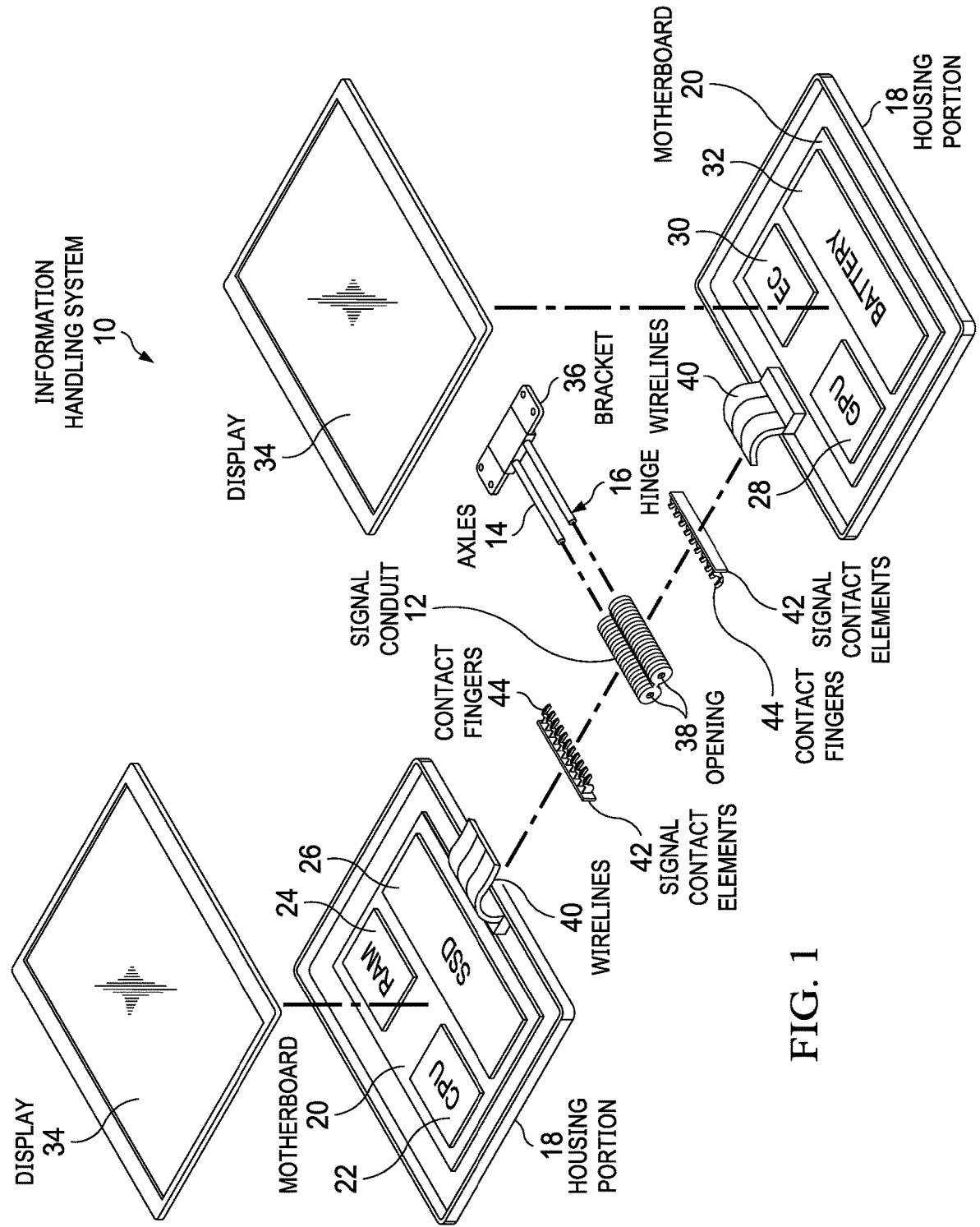
FIG. 1 depicts an exploded view of a portable information handling system having a signal conduit integrated with a dual axle hinge to transfer information between rotationally coupled housing portions.

Referring now to FIG. 1, an exploded view depicts a portable information handling system 10 having a signal conduit 12 integrated with a dual axle 14 hinge 16 to transfer information between rotationally coupled housing portions 18. In the example embodiment, information handling system 10 processes information with processing components disposed across both housing portions 18 that communicate through signal conduit 12. For example, in one of the housing portions 18 a first motherboard 20 interfaces a central processing unit (CPU) 22 with a random access memory (RAM) 24 and a solid state drive (SSD) 26. CPU 22 executes instructions, such as from an operating system and/or application, that are recalled to RAM 24 from SSD 26, such as through a boot process that powers up the system. The other housing portion 18 integrates a motherboard 20 that interfaces a graphics processor unit (GPU) 28 and embedded controller (EC) 30. GPU 28 processes information provided by CPU 22, such as through cooperation with a chipset, to create pixel values that define visual images at first and second displays 34 that couple over top of housing portions 18. Embedded controller 30 manages information handling system interactions with input/output devices, such as a keyboard, mouse and/or touchscreen, and also manages power applied to the processing components, such as power provided from an integrated power source like battery 32. The example embodiment shows one example disposition of processing components in housing portions 18, however, a variety of factors may drive different types of dispositions, such as thermal management, power consumption, communication latency between components, Z-height and other factors.

In the example embodiment, housing portions 18 rotationally couple to each other by one or more dual axis hinges 16. A bracket 36 couples to each housing portion 18 relative to an axle 14 with hinge 16 including a synchronization mechanism, such as gears, so that housing portions 18 rotate in a synchronized manner 360 degrees relative to each other. Thus, information handling system 10 rotates from a closed position having displays 34 facing each other to a variety of open positions. At approximately 90 degrees of rotation, a clamshell configuration allows one housing portion 18 to rest as a base while the other housing portion 18 elevates its display 34 to a viewing position. In this clamshell configuration, presentation of a keyboard at the display 34 of the base housing portion 18 allows an end user to type inputs while viewing the other display 34. At 180 degrees of rotation, both displays 34 rest in a shared plane to provide a tablet mode with an increased display footprint. Complete rotation of 360 degrees of the housing portions 18 relative to each other puts a display 34 on opposing faces of information handling system 10, such as may be convenient for a user to view information while mobile. Dual axis hinge 16 supports rotation between these configurations by synchronizing housing motion.

Supporting communication of processing components across a dual axis hinge presents a difficulty since cables that route through hinge 16 tend to bind unless adequate spacing is provided but increased spacing tends to increase the Z-height of information handling system 10. In the example embodiment, communication of processing components between housing portions 18 is routed through signal conduit 12, which includes two openings 38 aligned to fit over the two axles 14 of hinge 16. Signal conduit 12 integrates plural conductive surfaces that each carry signals across axles 14. Communication signals at each motherboard 20 proceeds through wirelines 40 to signal contact elements 42, which extend contact fingers 44 that interface with conductive surfaces of signal conduit 12. Thus, for example, communication signals proceed from a first wireline 40 to a first signal contact element 42 contact finger 44, which maintains an electrical interface with conductive surfaces of signal conduit 12 at 360 degrees of rotational orientation. Signal conduit 12 transfers the communications signals across hinge 16 axles 14 to transfer the signals to a contact finger 44 of the signal contact element 42 of the opposing housing portion. Contact fingers 44 interface with wirelines 40 to transfer communication signals received from signal conduit 12 to motherboard 20 and the processing components that it supports. The example embodiment depicts wirelines 40 as a cable that terminates on one end at motherboard 20 and at the opposite end at signal contact element 42, however, in alternative embodiments, signal contact elements 42 may mount directly to motherboard 20 aligned so that contact fingers 44 insert into signal conduit 12.

Figure 2:
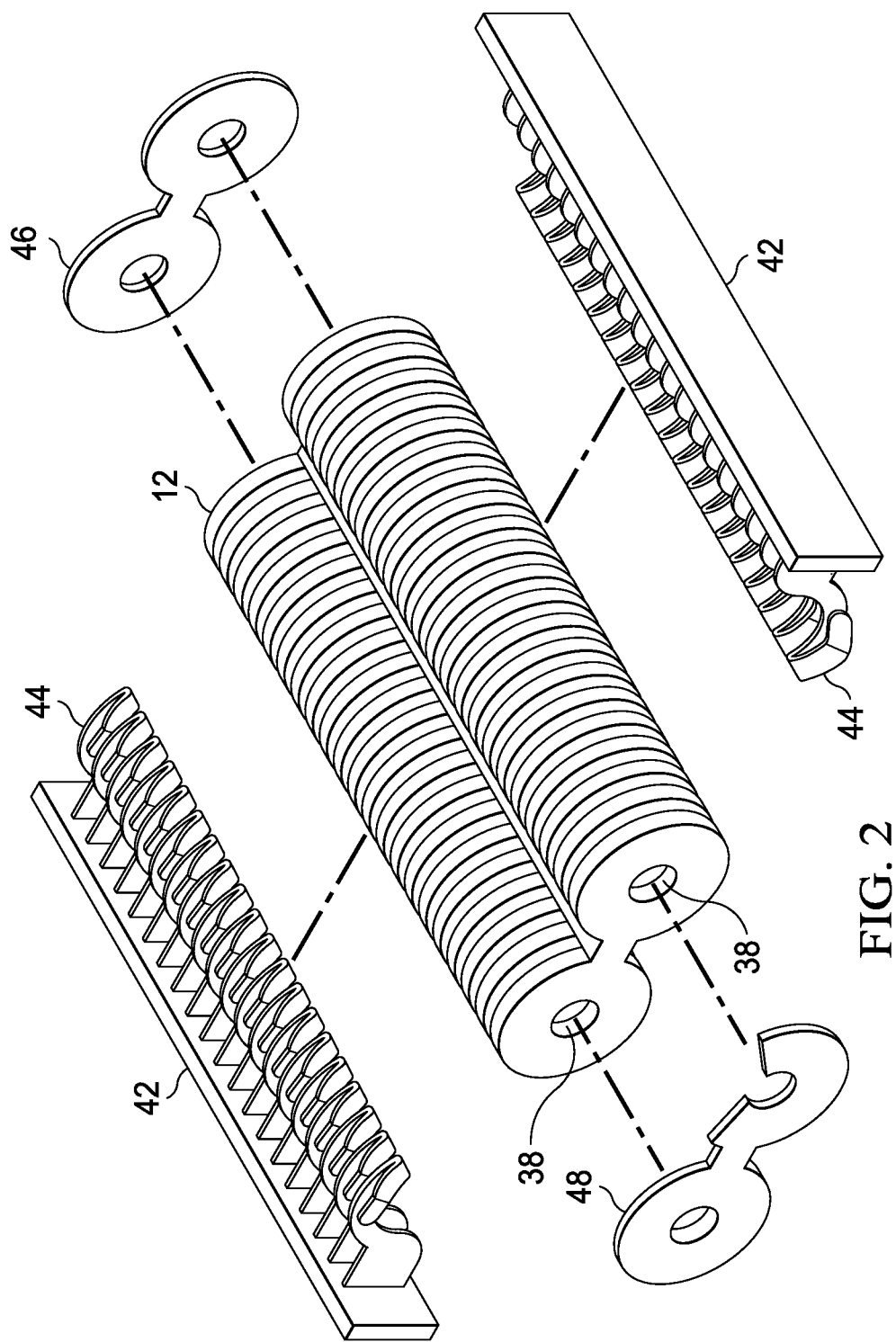
FIG. 2 depicts an exploded view of a signal communication system that transfers communication signals across a dual axis hinge.

Referring now to FIG. 2, an exploded view depicts a signal communication system that transfers communication signals across a dual axis hinge. In the example embodiment, signals conduit 12 is a stackable and overmolded set of twin-disc-shaped supports formed with two openings 38 collinear to hinge pivot axles of a 360 degree dual axis hinge. Each of the twin-disc-shaped supports stack in a contiguous body to form signal conduit 12 with space defined between each support for insertion of contact fingers 44 from opposing signal contact elements 42. In the example embodiment, a full conductive surface 46 or a partial conductive surface 48 is inserted in each opening to provide a conductive medium that conducts signals between contact fingers 44 of the opposing signal contact elements 42. Thus, for instance, each space formed in signal conduit 12 provides a single signal transmission pathway from a single contact finger 44 of each of opposing signal contact elements 42. Partial conductive surface 48 supports signal communication over only a predetermined range of rotational orientations by interceding a non-conductive surface that aligns with a conductive finger 44 over a defined rotational orientation range. In contrast, full conductive surface 46 maintains electrical signal transmission through a full 360 degrees of rotational orientation.

In the example embodiment, conductive surfaces are overmolded into signal conduit 12. In alternative embodiments, conductive surfaces may instead be insert molded or other manufacture techniques may be used as appropriate. Forming signal conduit 12 as a single contiguous piece offers efficiency in manufacture, however, in alternative embodiments individual twin-disc-shaped supports may be assembled into a signal conduit 12 of desired size. In one example embodiment, signal conduit 12 may be integrated with a torque element that applies friction in resistance to rotational movement around the dual axis hinge, which can aid in maintaining electrical contact by biasing supports together and against contact fingers 44. In one alternative example, a conductive surface may integrate on both sides of each support of signal conduit 12 so that each contact finger 44 carries two electrical signals, with an electrical signal communicated from each of opposing sides. In one example embodiment, differential signal pairs are communicated through opposing sides of a shared contact finger 44 and through opposing sides of a space within signal conduit 12 to aid in efficient communication. Alternatively, a differential signal pair may communicate through separate contact fingers to a single support of signal conduit 12 so that differential signals travel on opposing sides of the same support through conductive surfaces that are separated by a non-conductive material, such as plastic. In various embodiments, various arrangements of signals may be made as desired to improve signal transmission efficiency.

Referring now to FIG. 3, a side cutaway perspective view depicts an information handling system 10 that communicates signals between housing portions 18 through a signal conduit 12. In the example embodiment, information handling system 10 has rotated housing portions 18 slightly greater than 90 degrees to a clamshell configuration. A horizontal orientation of one housing 18 acts as a base that holds the other housing portion in a vertical orientation with display 34 in a viewing position. Contact fingers 44 extending from both housing portions 18 interface with a conductive surface of signal conduit 12 to define a signal pathway between the housing portions 18. As apparent in the example embodiment, a full conductive surface 46 will maintain a signal transmission interface through a full 360 degrees of rotation. In the example embodiment, full conductive surface 46 is a palladium-nickel (80-20) alloy with a hard gold flashed surface wear-resistant surface coating. In the example embodiment, a blown-up view of contact finger 44 depicts a spring surface 50 that biases towards a physical interface with conductive surface 46 by flexing spring surface 50 in response to a compression force that is perpendicular or normal to the conductive surface of the support in signal conduit 12. In an example embodiment in which contact finger 44 communicates two signals to opposing conductive surfaces, a spring surface 50 is exposed on opposing sides of contact finger 44 with a separate wireline interface to each spring surface 50.

Figure 4B:
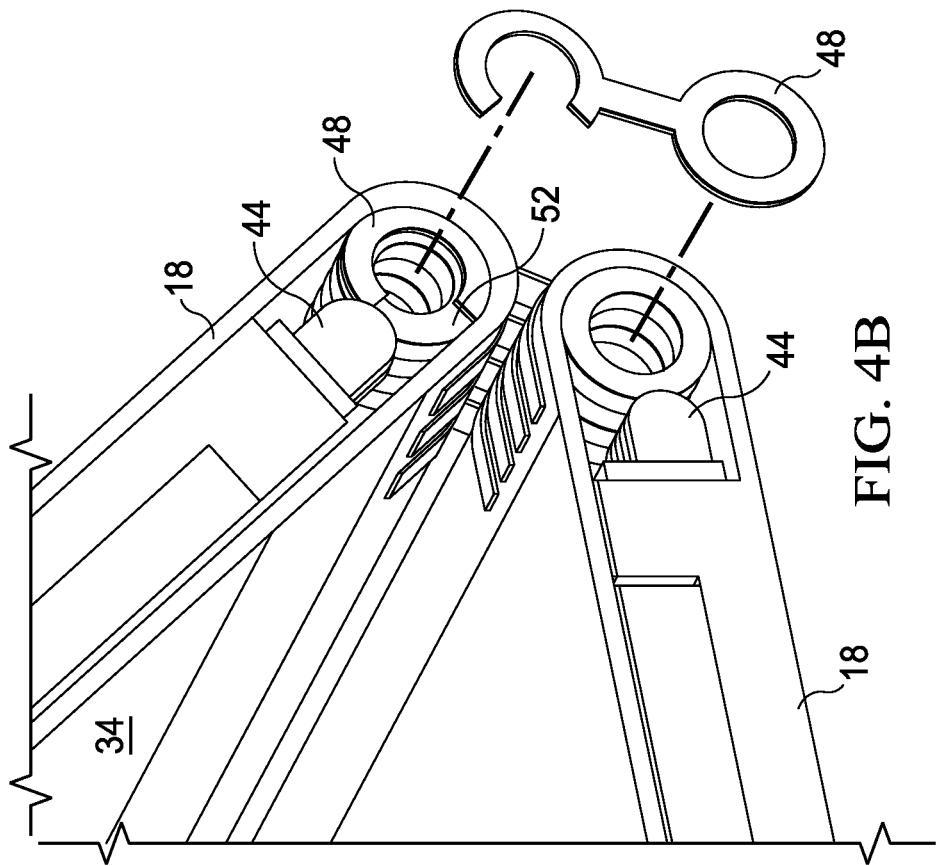
FIGS. 4A and 4B depict a side cutaway perspective view of an information handling system that communicates signals between housing portions at predetermined rotational orientations through a signal conduit having a partial conductive surface.
Figure 4A:
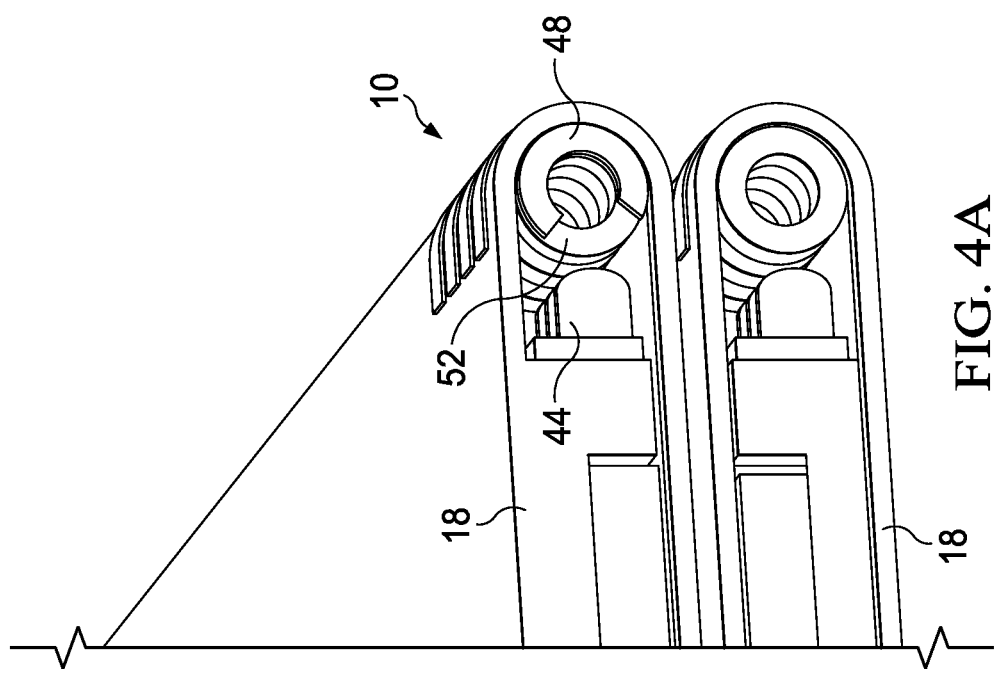

Referring now to FIGS. 4A and 4B, a side cutaway perspective view depicts an information handling system 10 that communicates signals between housing portions 18 at predetermined rotational orientations through a signal conduit 12 having a partial conductive surface 48. In the example embodiment, a transition is depicted of the information handling system 10 from a closed position to an open position where contact of a contact finger 44 relative to a partial conductive surface 48 determines application of power to information handling system 10. As depicted, in the closed position contact finger 44 aligns with a non-conductive portion 52 of signal conduit 12 so that a communication signal, such as power, is not transmitted between housing portions 18. Once the housing portions transition to an open position, contact finger 44 establishes signal communication with conductive surface 48, which indicates to information handling system 10 that a rotational orientation has been achieved at which power is to be applied to the processing components. In the example embodiment, alignment of contact finger 44 with a conductive surface triggers a signal transmission to indicate a function, such as by applying "high" at an embedded controller GPIO. In an alternative embodiment, alignment of contact fingers 44 with a non-conductive surface may trigger a function, such as by setting a GPIO "low."

In various embodiments, a variety of functions may be associated with defined rotational orientation ranges by alignment of one or more contact fingers 44 with conductive and/or non-conductive surfaces. For instance, in one example, alignment of a conductive or non-conductive surface may initiate a cutoff and/or re-connect of a battery with a power supply, such as to preserve battery life in an off mode. In another alternative embodiment, detection of a clamshell orientation may automatically apply a keyboard presentation at a display of one housing portion and remove a keyboard when a tablet mode is indicated. In yet another alternative embodiment, a display at one housing portion may be shutoff to preserve power, such as when only one display can be viewed at a time at 360 degrees of rotation. In another example embodiment, a flexible display, such as a plastic organic light emitting diode (POLED) display, may have tension automatically released at predetermined rotational orientations, such as in a closed position.

Figure 5:
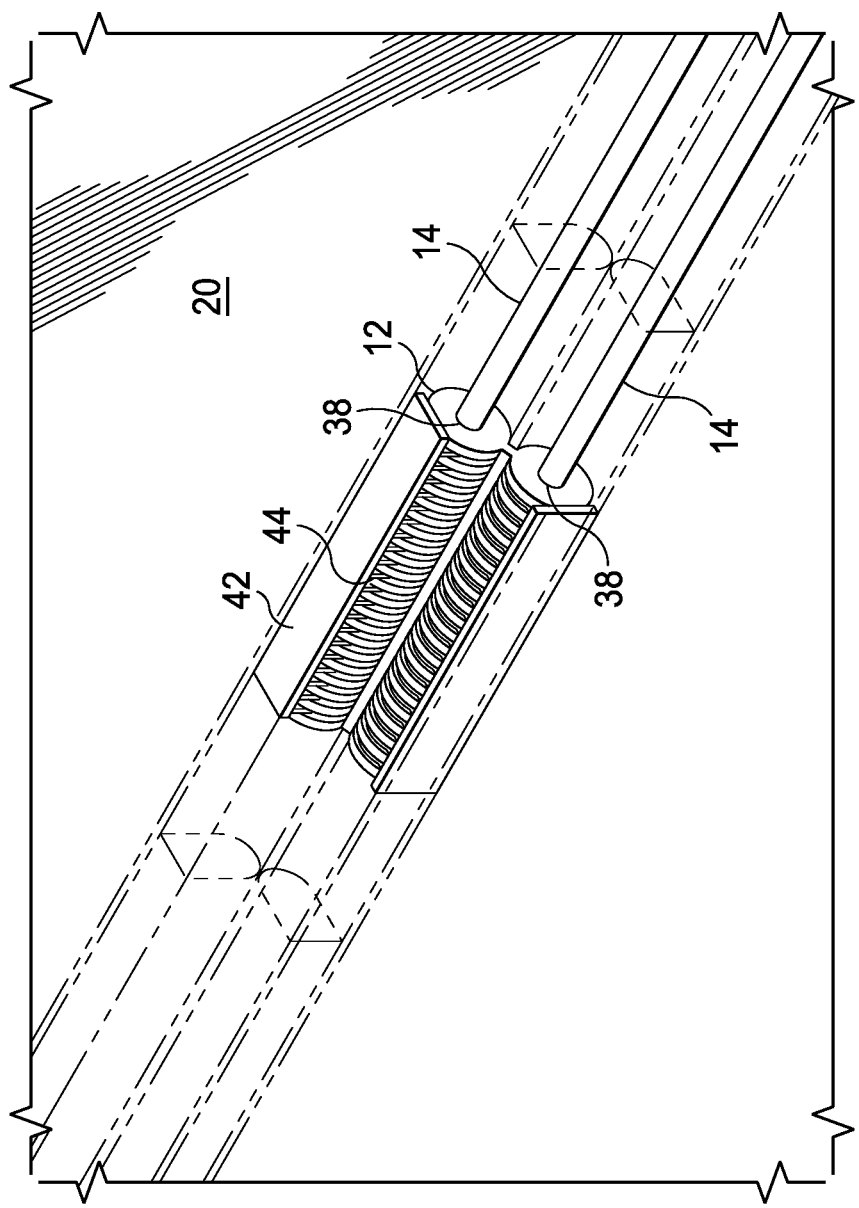
FIG. 5 depicts an upper perspective view of a signal communication system integrated in an information handling system in a closed configuration.

Referring now to FIG. 5, an upper perspective view depicts a signal communication system integrated in an information handling system 10 in a closed configuration. In the example embodiment, signal contact element 42 couples to motherboard 20 to accept signals from wirelines embedded in motherboard 20 and transmit the signals through signal conduit 12. Axles 14 of a dual axis hinge pass through openings 38 of signal conduit 12. In the example embodiment, signal conduit 12 is located at a central location of information handling system 10. In alternative embodiments, one or plural signal conduits 12 may be disposed along axles 14 at locations selected based upon processing component disposition or other design factors.

Although the present invention has been described in detail, it should be understood that various changes, substitutions and alterations can be made hereto without departing from the spirit and scope of the invention as defined by the appended claims.

What is claimed is:

1. A portable information handling system comprising:
    first and second housing portions;
    a dual axis hinge having first and second axles and rotationally coupling the first and second housing portions;
    processing components disposed in the first and second housing portions, the processing components cooperating to process information;
    a display integrated in at least one of the first and second housing portions and interfaced with the processing components, the display configured to present the information as visual images;
    first and second signal contact elements, the first signal contact element coupled to the first housing portion, the second signal contact element coupled to the second housing portion, each of the first and second signal contact elements having plural contact fingers; and
    a signal conduit interfacing the processing components of the first and second housing portions across the dual axis hinge, the signal conduit having plural supports, each support having first and second openings, the first axle inserted through the first opening, the second axle inserted through the second opening, each support further having a conductive surface aligned to contact one of the plural contact fingers of the first signal contact element and one of the plural contact fingers of the second signal contact element.

2. The portable information handling system of claim 1 wherein each of the plural supports have a conductive surface on only one side, each of the plural contact fingers having one conductive face aligned to contact one conductive surface.

3. The portable information handling system of claim 1 wherein each of the plural supports have first and second conductive surfaces on opposing sides, each of the plural contact fingers having first and second conductive faces on opposing sides to interface with separate conductive surfaces of separate supports.

4. The portable information handling system of claim 3 wherein at least one of contact fingers communicates a differential signal pair having a first signal passed through the first conductive face and a second signal passed through the second conductive face.

5. The portable information handling system of claim 1 wherein at least one support conductive surface has a nonconductive portion to block signal communication through the at least one support conductive surface between the first and second housing portions at predetermined rotational orientations.

6. The portable information handling system of claim 5 wherein the predetermined rotational orientations correspond to a clamshell configuration and the block of signal communication triggers presentation of a keyboard at the display.

7. The portable information handling system of claim 5 wherein the predetermined rotational orientations correspond to a tablet configuration and the block of the signal communication triggers removal of a keyboard from presentation at the display.

8. The portable information handling system of claim 5 wherein the predetermined rotational orientations correspond to a closed configuration and the block of the signal communication triggers a cutoff of power draw from a battery integrated in the first or second housing portions.

9. The portable information handling system of claim 5 wherein the predetermined rotational orientations correspond to a closed configuration and the block of the signal communication triggers a release of tension applied at the display.

10. A method for communicating signals between housing portions of a portable information handling system, the method comprising:
    terminating a first set of plural signal wires at a first signal contact element in a first housing portion, the first signal contact element having plural contact fingers, each signal wire of the first set of plural signal wires interfaced with one of the plural contact fingers;
    terminating a second set of plural signal wires at a second signal contact element in a second housing portion, the second signal contact element having plural contact fingers, each signal wire of the second set of plural signal wires interfaced with one of the plural contact fingers;
    rotationally coupling the first and second housing portions with a dual axle hinge having first and second axles; and
    interfacing the first and second set of plural signal wires across the dual axle hinge through a signal conduit having plural supports, each of the plural supports having first and second openings aligned to accept the first and second axles and a conductive surface disposed to contact at least one of the first signal contact element contact fingers and at least one of the second signal contact element contract fingers.

11. The method of claim 10 further comprising:
    sending a differential pair signal from first and second of the first set of plural signal wires to a first contact finger of the first signal contact element;
    communicating the differential pair signal from the first contact finger to first and second conductive surfaces of first and second supports disposed in the signal conduit; and
    receiving the differential pair signal from the first and second conductive surfaces at a first contact finger of the second signal contact element.

12. The method of claim 10 further comprising:
  disposing both a conductive surface and non-conductive surface on one or more of the signal conduit plural supports;
  rotating the first and second housing portions about the first and second axles to pass at least one contact finger across both the conductive surface and the non-conductive surface; and
  applying a signal received at the at least one contact finger to command a predetermined function at a predetermined rotational orientation of the housing portions.

13. The method of claim 12 wherein the predetermined rotational orientation comprises a clamshell configuration and the predetermined function comprises presentation of a keyboard at a display.

14. The method of claim 12 wherein the predetermined rotational orientation comprises a closed configuration and the predetermined function comprises cutting of current from a battery integrated in the information handling system.

15. The method of claim 12 wherein the predetermined rotational orientation comprises an open configuration and the predetermined function comprises turning on the information handling system.

16. A signal communication system comprising:
  first and second signal contact elements, each signal contact element having plural contact fingers, each of the plural contact fingers interfaced with one or more communication wirelines; and
  a signal conduit having plural supports, each support having first and second openings formed to align with first and second axles of a dual axle hinge, each support further having at least one conductive surface;
  wherein:
    each of the plural contact fingers of the first signal contact element interfaces with a different one of the plural support conductive surfaces;
    each of the plural contact fingers of the second signal contact element interfaces with a different one of the plural support conductive surfaces; and
    signals communicate from the first signal contact element communication wirelines to the second signal contact element communication wirelines through associated of the contact fingers and conductive surfaces.

17. The signal communication system of claim 16 wherein:
  at least some of the plural contract fingers interface with first and second communication wirelines; and
  at least some of the plural supports have conductive surfaces disposed on first and second opposing sides.

18. The signal communication system of claim 16 wherein the conductive surface is formed with an over mold of a conductive material.

19. The signal communication system of claim 16 wherein the conductive surface is formed with an insert mold of a conductive material.

20. The signal communication system of claim 16 wherein the plural contact fingers comprise a palladium nickel alloy having a gold overlayer.

* * * * *